Oct. 4, 1955  E. W. SMITH  2,719,559
DUAL WHEEL SPACER BANDS
Filed Oct. 7, 1952  2 Sheets-Sheet 1
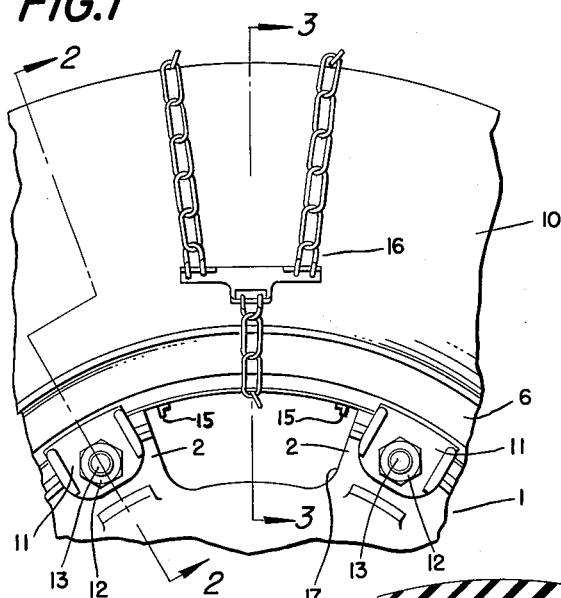
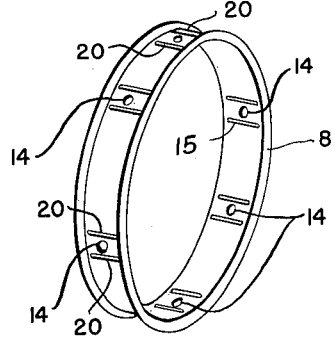
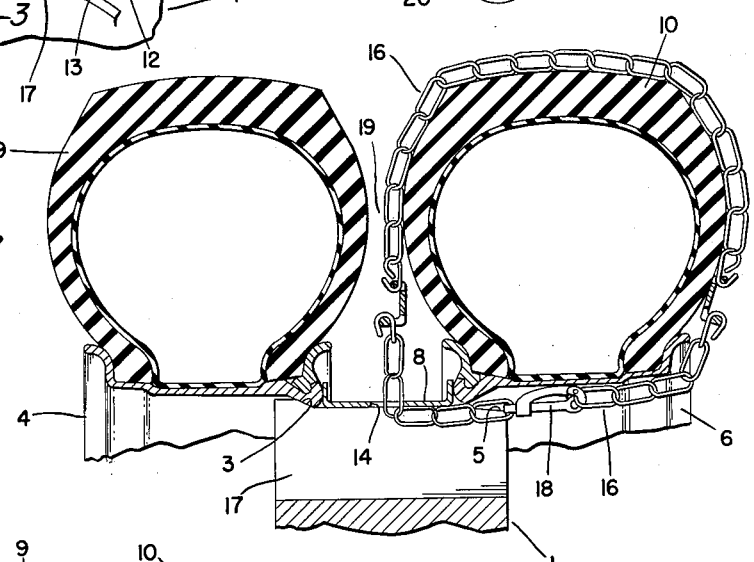
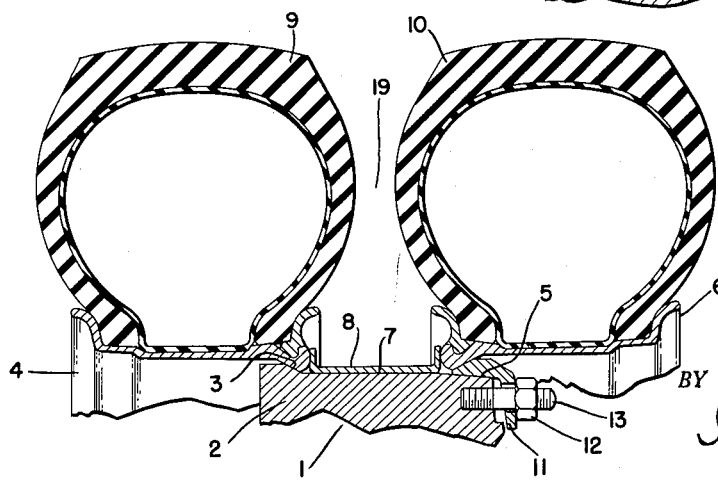
INVENTOR.
EDWARD W. SMITH
BY
Isler and Ornstein
ATTORNEYS Oct. 4, 1955 — E. W. SMITH — 2,719,559
DUAL WHEEL SPACER BANDS
Filed Oct. 7, 1952 — 2 Sheets-Sheet 2
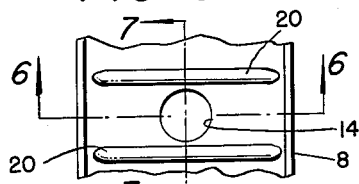
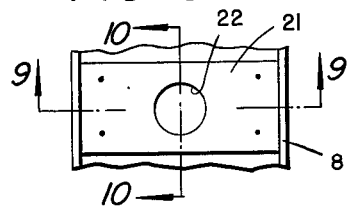
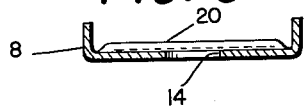
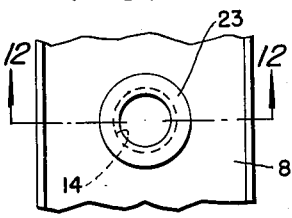
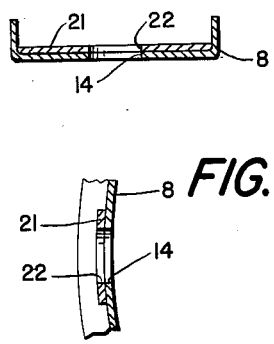
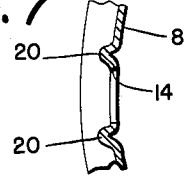
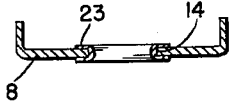
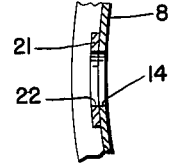
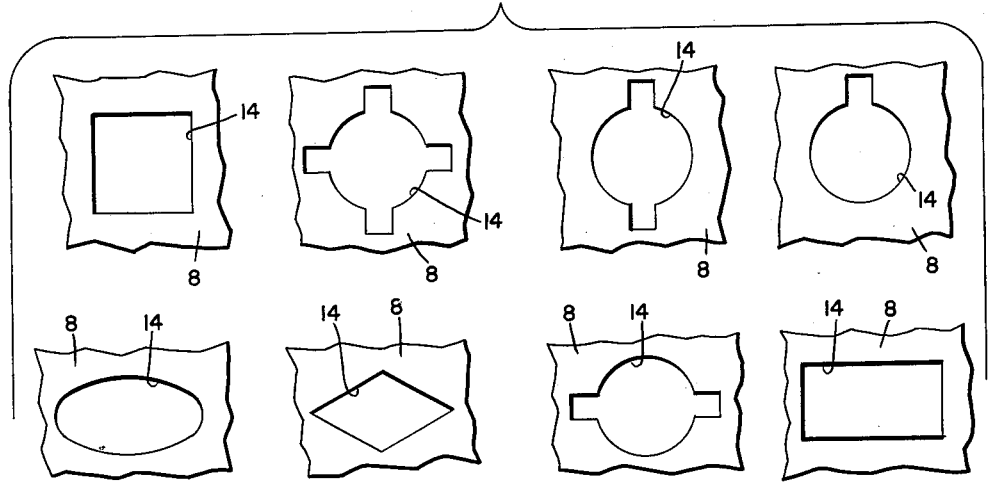
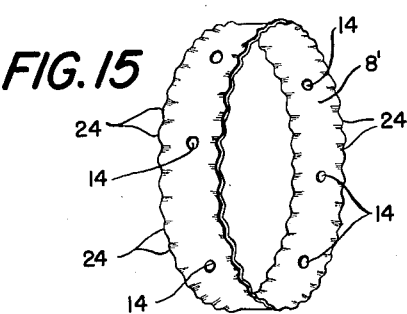
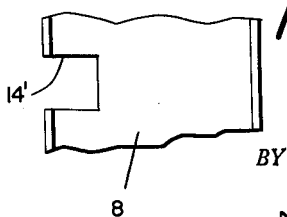
INVENTOR.
EDWARD W. SMITH
BY Edward Ornstein
ATTORNEYS

United States Patent Office 2,719,559
Patented Oct. 4, 1955

2,719,559

DUAL WHEEL SPACER BANDS

Edward W. Smith, Cleveland, Ohio, assignor of fifty per cent to John N. Mayer, Cleveland, Ohio Application October 7, 1952, Serial No. 313,491

3 Claims. (Cl. 152—220)

This invention relates generally to dual tire vehicle wheels, but has reference more particularly to novel spacer or bands for such wheels.

Dual tire vehicle wheels of the disc-type shown in Reyburn Patent No. 1,888,568 and Copp Patent No. 2,344,972 usually consist of two discs which are permanently or otherwise secured to each other, and are provided with flaring peripheral or flange portions to which the rims of the wheel are secured. These flaring flange portions are usually provided with large openings, enabling an emergency chain, such, for example, as the one shown in Fig. 5 of the Copp patent to be attached to the outboard tire, the chain passing through such opening.

Dual wheels of the foregoing type have been replaced to a very large extent in recent years by a type of wheel of which the "70 Series" manufactured by The Goodyear Tire and Rubber Company, is typical. This wheel utilizes a single central spider having radial spokes to the end of which the rims of the tires are removably clamped in spaced relationship, an annular spacer or spacer band being utilized to maintain the spaced relationship.

These angular spacers or spacer bands are not provided with openings through which an emergency chain can be passed in order to secure the chain to the outboard tire, and consequently, it is customary to run a longer emergency chain through the spaces between the spokes and about both tires of the dual wheel structure. Such longer chains are not only expensive, but are difficult to apply, since the space between the inboard tire and the brake drum is usually very small, and even after being applied, difficulties may arise due to the fact that the emergency chain strikes the brake drum or possibly other parts of the vehicle adjacent the brake drum.

I have discovered, as to the result of considerable experimentation, that all of the aforesaid disadvantages and difficulties incidental to the use of such an annular spacer, can be overcome by the provision of circumferentially-spaced holes, openings, notches or recesses in the annular spacer, or spacer band, through which an emergency chain can be passed.

Other objects and advantages of my invention will be apparent during the course of the following description. In the accompanying drawings forming a part of this specification and in which like numerals are employed to designate like parts throughout the same:

Fig. 1 is a fragmentary elevational view of a dual wheel embodying the invention and showing an emergency chain applied to the outboard wheel;

Fig. 2 is a fragmentary cross-sectional view, taken on the line 2—2 of Fig. 1;

Fig. 3 is a fragmentary cross-sectional view, taken on the line 3—3 of Fig. 1;

Fig. 4 is a perspective view of the spacer band shown in Figs. 2 and 3;

Fig. 5 is a fragmentary plan view, showing one method of reinforcing the spacer band in the area of the holes or openings in the band;

Fig. 6 is a fragmentary cross-sectional view, taken on the line 6—6 of Fig. 5;

Fig. 7 is a fragmentary cross-sectional view, taken on the line 7—7 of Fig. 5;

Fig. 8 is a view similar to Fig. 5, but showing another method of reinforcing the band in the area of the hole;

Fig. 9 is a cross-sectional view, taken on the line 9—9 of Fig. 8;

Fig. 10 is a cross-sectional view, taken on the line 10—10 of Fig. 8;

Fig. 11 illustrates the use of a grommet to reinforce the hole;

Fig. 12 is a fragmentary cross-sectional view, taken on the line 12—12 of Fig. 11;

Fig. 13 shows holes of various contours or shapes which may be used in the spacer band;

Fig. 14 is a fragmentary plan view, showing a modified form of opening in the spacer band, and Fig. 15 illustrates a conventional corrugated spacer band, having holes therein in accordance with the invention.

Referring more particularly to Figs. 1 to 4 inclusive of the drawings, reference character 1 designates the central or hub portion of a wheel of the spider type having radial spokes 2, the outer peripheries of which are transversely sloped to provide an abutment 3 for the inboard rim 4 of the dual wheel, a portion 5 for reception of the outboard rim 6 of the dual wheel, and an intermediate portion 7 upon which the spacer band 8 is mounted, the spacer band functioning to maintain the rims 4 and 6 in spaced relationship. Reference characters 9 and 10 designate the inboard and outboard tires respectively of the dual wheel assembly.

The dual assembly, as thus described, is maintained by means of wedge clamps 11 which are wedgingly secured between the portions 5 of the spokes and the rims 6 by means of nuts 12 which are secured to studs 13 extending through the wedge clamps and into the spokes 2.

The spacer band 8 is of channel-shaped cross-section and is provided with circular holes 14 extending radially therethrough, these holes being spaced circumferentially to correspond with the number of spokes 2 of the wheel. In order to insure that the holes 14 will remain at some position between the spokes 2, when the band 8 is placed on the wheel, lugs 15 are secured to the radially-inward face of the band 8, these lugs being spaced from the holes 14 in such a manner that when the holes 14 are disposed centrally between the spokes, the lugs will be about ½" to 1" from the spokes, as shown in Fig. 1. With the lugs 15 thus arranged, the spacer band, during operation of the vehicle, cannot slip circumferentially more than ½" to 1" relatively to the spokes of the wheel, since the lugs will abut the spokes and prevent further slippage. This provision of lugs is of some importance since it is essential to maintain the holes 14 at all times at some position between the spokes, in order to prevent the emergency chain, to be presently described, from being dragged against the spokes.

An emergency chain, designated by reference numeral 16, may be applied to the outboard tire 10 by passing the chain through one of the holes 14, and through the adjacent space 17 between the spokes 2, and securing the chain to the tire and rim 6 by means of a conventional fastener or buckle 18.

The holes 14 are preferably disposed centrally of the band 8, as this permits the chain to be dropped vertically through the space 19 between the inboard and outboard tires, and directly into the hole 14, thus facilitating application of the emergency chain to the outboard tire. It is to be understood, however, that the holes 14 may be disposed at other points transversely of the spacer band.

It is to be understood also that the chain can, in like manner, be applied to the inboard tire, in cases where there is sufficient clearance between the tire and brake drum, although application of the chain to inboard tires will, in general, be more difficult than application of the chain to the outboard tire.

The provision of the holes 14 in the spacer band thus overcomes the disadvantages inherent in the use of emergency chains in connection with dual wheels of this type, since emergency chains of conventional lengths can be utilized, the chains can be applied to the outboard tires of such wheels, and the chains can be applied with a minimum of effort.

In Figs. 5, 6 and 7, the spacer band is reinforced in the areas adjacent the holes 14 by the use of transverse ribs 20, which are stamped upwardly from the metal of the band 8, at points closely adjacent the hole 14, the ribs extending to the flanges of the channel.

In Figs. 8, 9 and 10, the spacer band is reinforced in the areas adjacent the holes 14 by the use of plates 21 which are spot welded to the upper surface of the band and have central holes 22 which are in axial alignment with the holes 14.

In Figs. 11 and 12, the edges of the holes 14 are reinforced by the use of grommets 23 which are riveted to the band. Since these grommets are transversely rounded, they act also to guide the emergency chain into the hole 14.

In Fig. 13, I have illustrated various contours or shapes which the holes 14 in the spacer band can assume. The radial slots extending from the circular holes in this figure are adapted to receive the chain 16 in a manner such as to lock the chain against movement transversely around the tire 10, that is to say, these slots function to prevent the chain from slipping around the tire.

In Fig. 14, a modification is shown, in which, instead of using holes in the spacer band, such as the holes 14, recesses 14' may be formed in that edge of the band 8 which is adjacent the outboard tire of the dual wheel. These recesses 14' are made of a size sufficient to pass the emergency chain therethrough.

In Fig. 15, I have illustrated a spacer band of the so-called corrugated type, comprising an annular band 8' having the edges thereof provided with corrugations 24, these corrugations abutting the rims 4 and 6 in the dual wheel assembly. The band 8' is provided with holes 14 at circumferentially-spaced points, for reception of an emergency chain. The holes 14 may be of any desired contour or shape.

It is to be understood that the forms of my invention, herewith shown and described, are to be taken as preferred examples of the same, and that various changes in the shape, size, and arrangement of parts may be resorted to, without departing from the spirit of my invention, or the scope of the subjoined claims.

Having thus described my invention, I claim:

1. In combination, a dual wheel assembly comprising a wheel having radially-extending spokes, rims mounted on said spokes in spaced relation, tires mounted on said rims, an annular spaced band mounted on said spokes and spacing said rims from each other, said band having circumferentially-spaced openings extending therethrough for the passage of an emergency chain, said openings being spaced circumferentially so as to be in registration with spaces between said spokes, and spaced means secured to said band and extending radially inwardly from the band between the spokes for engagement with adjacent spokes for limiting displacement of said band in both directions circumferentially of said wheel.

2. The combination, as defined in claim 1, in which said means comprises lugs projecting radially inwardly from the band.

3. The combination, as defined in claim 1, in which the openings in the band are centrally located transversely of the band.

References Cited in the file of this patent

UNITED STATES PATENTS

| | | |
|---|---|---|
| 2,201,632 | Roessel | May 21, 1940 |
| 2,486,569 | Malthaner | Nov. 1, 1949 |
| 2,537,181 | Ash | Jan. 9, 1951 |
| 2,592,997 | Ash | Apr. 15, 1952 |
| 2,624,388 | Kane | Jan. 6, 1953 |
| 2,652,091 | Kane | Sept. 15, 1953 |